(12) United States Patent
Smith et al.

(10) Patent No.: US 7,650,961 B2
(45) Date of Patent: Jan. 26, 2010

(54) DIFFERENTIAL LOCK CONTROL SYSTEM AND ASSOCIATED METHOD

(75) Inventors: Brent A. Smith, Peosta, IA (US); Scott J. Breiner, Dubuque, IA (US); Andrew W. Kelly, Sherrill, IA (US)

(73) Assignee: Deere & Company, Moline, IL (US)

( * ) Notice: Subject to any disclaimer, the term of this patent is extended or adjusted under 35 U.S.C. 154(b) by 450 days.

(21) Appl. No.: 11/608,687

(22) Filed: Dec. 8, 2006

(65) Prior Publication Data

US 2008/0135322 A1    Jun. 12, 2008

(51) Int. Cl.
    *B60K 17/00*    (2006.01)
(52) U.S. Cl. ...................................................... 180/338
(58) Field of Classification Search ................. 180/338; 475/84, 86; 701/50, 51
    See application file for complete search history.

(56) References Cited

U.S. PATENT DOCUMENTS

| | | | |
|---|---|---|---|
| 3,446,320 A * | 5/1969 | Schott | 192/221 |
| 3,640,360 A * | 2/1972 | Dollase | 192/220 |
| 4,183,419 A | 1/1980 | Henn et al. | |
| 4,523,494 A | 6/1985 | Sparks et al. | |
| 4,549,448 A | 10/1985 | Kittle | |
| 4,559,847 A | 12/1985 | Newendorp et al. | |
| 4,570,509 A | 2/1986 | Nighswonger | |
| 4,809,586 A | 3/1989 | Gage et al. | |
| 4,867,010 A | 9/1989 | Stettler, Jr. | |
| 5,024,634 A | 6/1991 | Blessing | |
| 5,026,335 A | 6/1991 | Oftedal et al. | |
| 5,078,215 A | 1/1992 | Nau | |
| 5,107,932 A | 4/1992 | Zachman et al. | |
| 5,125,490 A | 6/1992 | Suzumura et al. | |
| 5,301,769 A | 4/1994 | Weiss | |
| 5,505,267 A | 4/1996 | Orbach et al. | |
| 5,676,219 A * | 10/1997 | Fruhwirth et al. | 180/197 |
| 5,899,292 A | 5/1999 | Paul et al. | |
| 6,009,969 A | 1/2000 | Salcher et al. | |
| 6,038,506 A | 3/2000 | Diekhans et al. | |
| 6,152,237 A | 11/2000 | Hartman et al. | |
| 6,174,255 B1 | 1/2001 | Porter et al. | |
| 6,357,315 B1 | 3/2002 | Smith et al. | |
| 6,389,345 B2 | 5/2002 | Phelps | |
| 6,390,226 B1 | 5/2002 | Smith et al. | |
| 6,640,850 B1 | 11/2003 | Hicks | |
| 6,668,225 B2 | 12/2003 | Oh et al. | |

(Continued)

FOREIGN PATENT DOCUMENTS

EP    1090799 A2    11/2001

(Continued)

OTHER PUBLICATIONS

English Translation For Abstract of JP 2003237619 (1 page).

(Continued)

*Primary Examiner*—Paul N Dickson
*Assistant Examiner*—Robert A Coker

(57) ABSTRACT

A differential lock control system for controlling a differential lock of a work vehicle is adapted to determine if the work vehicle is oriented to travel in a generally straight direction, and, if the work vehicle is so oriented, automatically command activation of the differential lock. An associated method is disclosed.

12 Claims, 3 Drawing Sheets

U.S. PATENT DOCUMENTS

| | | |
|---|---|---|
| 7,152,720 B2 * | 12/2006 | Claussen et al. ......... 192/30 W |
| 7,325,636 B2 | 2/2008 | Yeoman et al. |
| 2006/0180371 A1 | 8/2006 | Breed et al. |
| 2007/0032938 A1 | 2/2007 | Hrovat et al. |
| 2007/0250236 A1 | 10/2007 | Newberry et al. |

FOREIGN PATENT DOCUMENTS

| | | |
|---|---|---|
| JP | 2003-237619 | 8/2003 |
| JP | 2003237619 A * | 8/2003 |
| WO | 2005100133 A1 | 10/2005 |

OTHER PUBLICATIONS

Nov. 4, 2008 Office Action of U.S. Appl. No. 11/408,018.
Mar. 31, 2009 Office Action of U.S. Appl. No. 11/408,018.
Caterpillar Brochure on 24M Motor Grader Preliminary (20 pages) (electronic metadata indicates created on Dec. 11, 2006.
English translation of Japanese Kokai Patent Application No. P2003-237619A (published Aug. 27, 2003).
Technical Manual D Series Motor Grader Operation and Test (5 pages) (Jan. 7, 2006).
Technical Manual TeamMate II 1200-1400-1600 Axles (4 pages) (Jul. 26, 2006).

* cited by examiner

DIFFERENTIAL LOCK CONTROL SYSTEM AND ASSOCIATED METHOD

FIELD OF THE DISCLOSURE

The present disclosure relates to apparatus and methods for control of a differential lock.

BACKGROUND OF THE DISCLOSURE

A differential may be used on a work vehicle to transmit power to ground-engaging wheels of the work vehicle while allowing the wheels to rotate at different speeds. A differential lock may be associated with the differential such that, when activated, the differential lock disallows the wheels to rotate at different speeds. This is helpful in order to prevent spinning of, for example, one of the wheels due to traction loss.

SUMMARY OF THE DISCLOSURE

According to the present disclosure, there is provided a differential lock control system for controlling a differential lock of a work vehicle. The differential lock control system is adapted to determine if the work vehicle is oriented to travel in a generally straight direction, and, if the work vehicle is so oriented, automatically command activation of the differential lock. An associated method is disclosed.

The differential lock control system comprises a sensor unit and a controller. The controller is adapted to receive at least one turn angle signal from the sensor unit, determine if the work vehicle is oriented to travel in a generally straight direction based on the at least one turn angle signal, and, if the work vehicle is so oriented, automatically command activation of the differential lock.

Exemplarily, the sensor unit comprises an articulation angle sensor and a steering angle sensor. The articulation angle sensor is for sensing an articulation angle between articulated front and rear sections of the work vehicle. The steering angle sensor is for sensing a steering angle of a ground-engaging traction element of the work vehicle (e.g., wheel or track). The controller is adapted to receive from the articulation angle sensor an articulation angle signal representative of the articulation angle and from the steering angle sensor a steering angle signal representative of the steering angle and determine a turn angle of the work vehicle based on the articulation angle signal and the steering angle signal. The controller may determine the turn angle by summing the articulation angle and the steering angle. The controller may determine if the work vehicle is oriented to travel in a generally straight direction by determining if the turn angle is within a tolerance about the zero turn angle (e.g., 0°+/−5°).

If the work vehicle is oriented to travel in a generally straight direction, the controller outputs a control signal automatically commanding activation of the differential lock. If the controller determines that the work vehicle is oriented to turn (rather than travel in a generally straight direction), the controller automatically commands de-activation of the differential lock.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
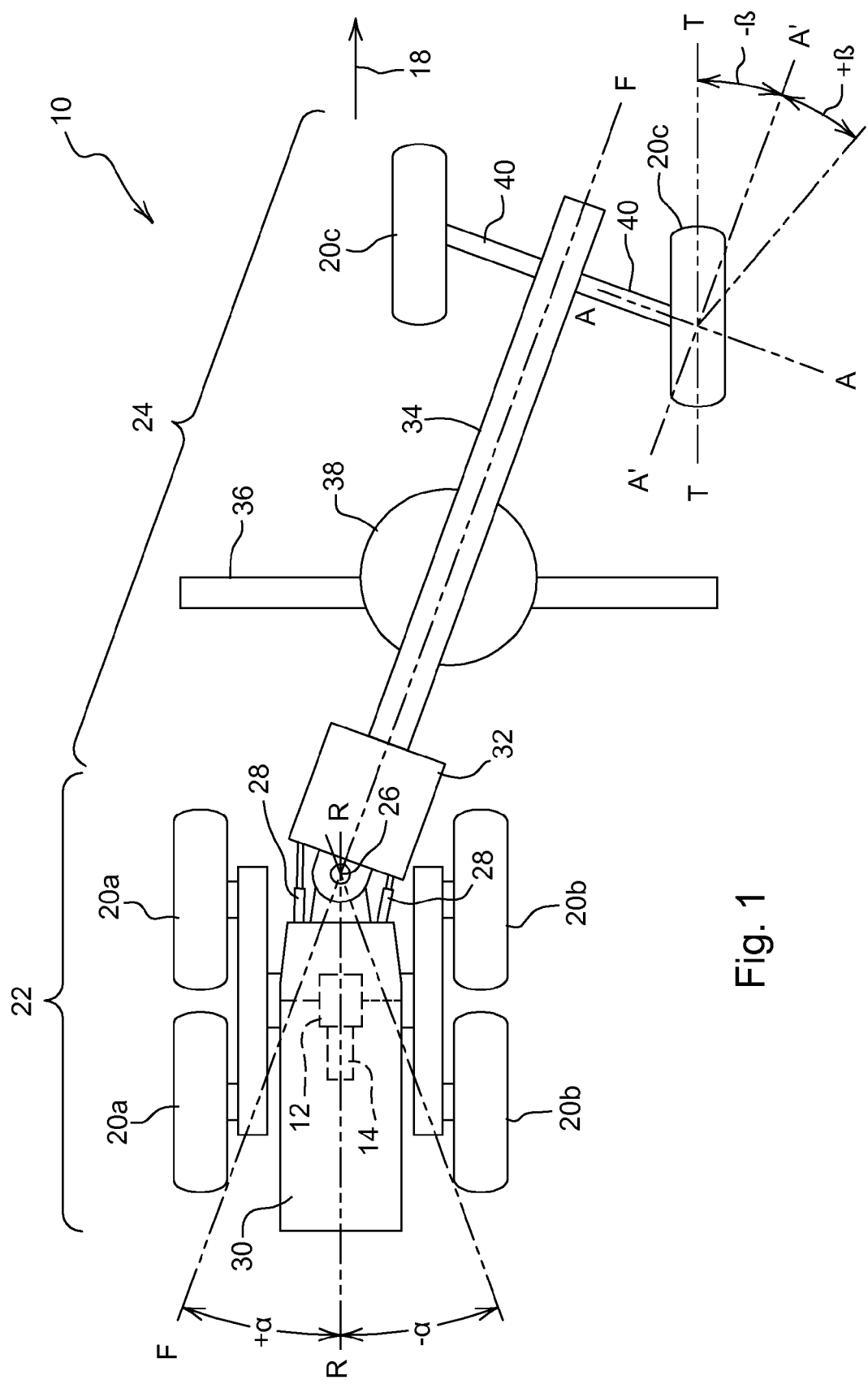
FIG. 1 is a top schematic view of a work vehicle in the form of, for example, a motor grader.
Figure 2:
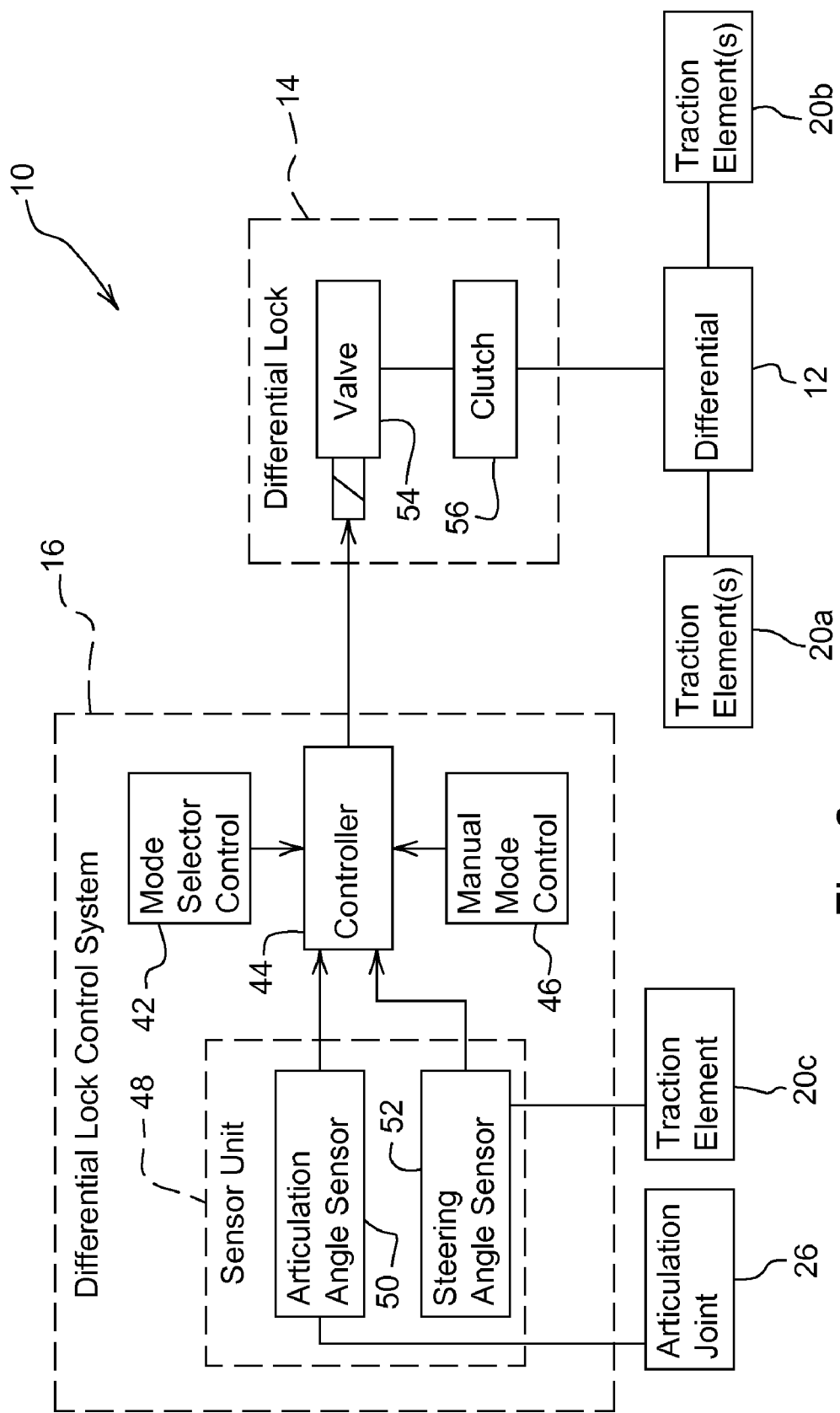
FIG. 2 is a schematic block diagram showing a differential lock control system for controlling operation of a differential lock of the work vehicle of FIG. 1.

Referring to FIGS. 1 and 2, there is shown a work vehicle 10 configured, for example, as a motor grader. The vehicle 10 includes a differential 12, a differential lock 14, and a differential lock control system 16, as shown best, for example, in FIG. 2. The differential lock control system 16 is adapted to determine if the work vehicle 10 is oriented to travel in a generally straight direction 18 (FIG. 1), and, if the work vehicle 10 is so oriented, automatically command activation of the differential lock 14 to lock the differential 12. Such locking of the differential 12 prevents relative rotation between ground-engaging traction elements 20a and 20b on opposite sides of the vehicle 10, thereby reducing traction element slippage in the event of traction loss by traction element(s) on the opposite side, at a time when the traction elements 20a, 20b generally do not need to be able to rotate at different speeds, i.e., when the vehicle 10 is traveling in a generally straight direction. In the case of a motor grader (FIG. 1), such locking prevents relative rotation between the left rear traction elements 20a of the left tandem and the right rear traction elements 20b of the right tandems.

Referring now primarily to FIG. 1, the illustrative work vehicle 10 has a rear section 22 and a front section 24 articulated to the rear section 22 for rotation about a generally vertical articulation axis (perpendicular to the sheet of FIG. 1) defined by an articulation joint 26. Two hydraulic cylinders 28 may be attached to the sections 22 and 24 so as to extend therebetween on either side of the joint 26 for rotation of the front section 24 relative to the rear section 22 about the articulation axis. As such, a longitudinal axis F of the front section 24 and a longitudinal axis R of the rear frame cooperate to define an articulation angle ($\alpha$) therebetween. According to an exemplary sign convention, the front section 24 may be articulated to the right relative to the rear section 22 to assume a positive articulation angle (e.g., +$\alpha$) and the front section 24 may be articulated to the left relative to the rear section 22 to assume a negative articulation angle (e.g., −$\alpha$).

In the particular non-limiting example in which the vehicle 10 is configured as a motor grader, the rear section 22 includes components of the rear power train. In particular, an engine (not shown) of the vehicle 10 is housed in an engine compartment 30. Further, in this particular non-limiting example, the differential 12 and differential lock 14 provided therefor are also part of the rear section 22. The front section 24 includes an operator's station 32 mounted on a frame 34. A blade 36 (commonly referred to as a moldboard) is provided in the front section 24 for sculpting the ground. The blade 36 is attached to a gear or circle 38 for rotation about a generally vertical axis defined by the circle 38.

Illustratively, two steerable ground-engaging front traction elements 20c support the front section 24 on either side of the front frame 34. The traction elements 20c can be steered by use of the steering system of the vehicle 10. Such steering of the traction elements 20c adjusts the steering angle $\beta$ of each traction element 20c. The steering angle $\beta$ is defined between a traction element direction line T and a line A'. The traction element direction line T points in the same direction as the traction element 20c. The line A' is perpendicular to a rotation axis A of the respective traction element 20c, the rotation axis being defined by a respective axle 40. As such, according to the exemplary sign convention, each traction element 20c may be steered to the right to assume a positive steering angle (e.g., +β) and to the left to assume a negative steering angle (e.g., -β).

Referring to FIG. 2, the differential lock control system 16 exemplarily has a mode selector control 42. The control 42 may be located at the operator's station 32 for access thereto by the vehicle operator. The control 42 may be selectively switched by the operator between a manual mode and an automatic mode. A controller 44 in the form of, for example, one or more electronic controllers, reads a mode selection signal from the mode selector control 42 and determines from this input signal which mode has been selected.

In the manual mode, the controller 44 is responsive to inputs from a manual mode control 46. The manual mode control 46 is located, for example, at the operator's station 32 for actuation by the operator to selectively activate and de-activate the differential lock 14.

In the automatic mode, the controller 44 is responsive to inputs from a sensor unit 48, rather than the manual mode control. As such, the controller 44 is adapted to receive at least one turn angle signal from the sensor unit 48, determine if the work vehicle 10 is oriented to travel in a generally straight direction based on the at least one turn angle signal, and, if the work vehicle is so oriented, automatically command activation of the differential lock 14.

It is to be understood that, alternatively, the system 16 may not include the option of controlling the differential lock 14 manually. Instead, the system 16 may be configured to operate in the automatic mode only.

Exemplarily, the sensor unit 48 includes an articulation angle sensor 50 and a steering angle sensor 52. The articulation angle sensor 50 senses the articulation angle α between articulated front and rear sections 24, 22 of the work vehicle 10. It may be positioned at the articulation joint 26 to measure this angle. The steering angle sensor 52 senses the steering angle β of one of the traction elements 20c and may be positioned at the rotation joint of the traction element 20c, so as to sense the angle β between the axle 40 and a kingpin associated with the traction element 20c. Each of the sensors 50, 52 may be configured in a variety of ways including, but not limited to, as one or more rotary sensors, one or more resolvers, one or more lvdt's, and/or the like.

The controller 44 is adapted to receive from the articulation angle sensor 50 an articulation angle signal representative of the articulation angle α and from the steering angle sensor 52 a steering angle signal representative of the steering angle β and determine a turn angle (θ) of the work vehicle based on the articulation angle signal and the steering angle signal. The controller 44 may be configured to determine the turn angle by summing the articulation angle and the steering angle according to the equation θ=α+β. The controller 44 then determines if the work vehicle 10 is oriented to travel in a generally straight direction by determining if the turn angle is within a tolerance about the zero turn angle (e.g., 0°+/−5°). Such criteria may be represented by the equation $Tol_1 \leq \theta \leq Tol_2$, wherein $Tol_1$ is a lower tolerance limit and $Tol_2$ is an upper tolerance limit.

If the turn angle is within the turn angle tolerance, the controller 44 commands activation of the differential lock 14 so as to lock the differential 12. The controller 44 may do so by outputting a control signal to the solenoid portion of an electro-hydraulic valve 54 of the lock 14 causing a clutch 56 of the lock 14 to engage the differential 12. Alternatively, the valve 54 may be configured so as to cause the clutch 56 to engage the differential 12 when no control signal is present.

If the turn angle is outside the turn angle tolerance, the controller 44 commands de-activation of the differential lock 14 so as to unlock the differential 12. The controller 44 may do so by outputting a control signal to the solenoid portion of the valve 54 causing the clutch 56 to disengage the differential 12. Alternatively, the valve 54 may be configured so as to cause the clutch 56 to disengage the differential 12 when no control signal is present.

By way of example, consider the orientation of the work vehicle 10 in FIG. 1. In that example, the articulation angle α is about +26° (positive because the front section 24 is angled to the right) and the steering angle β is about −26° (negative because traction element 20c is angled to the left relative to the neutral position defined by line A'). Summing α and β gives rise to a turn angle θ of 0° for the vehicle 10, i.e., 26°+(−26)=0°. In such a case, the controller 44 would consider the vehicle 10 to be traveling in a generally straight direction, and, in response thereto, would command activation of the differential lock 14 to lock the differential 12.

Figure 3:
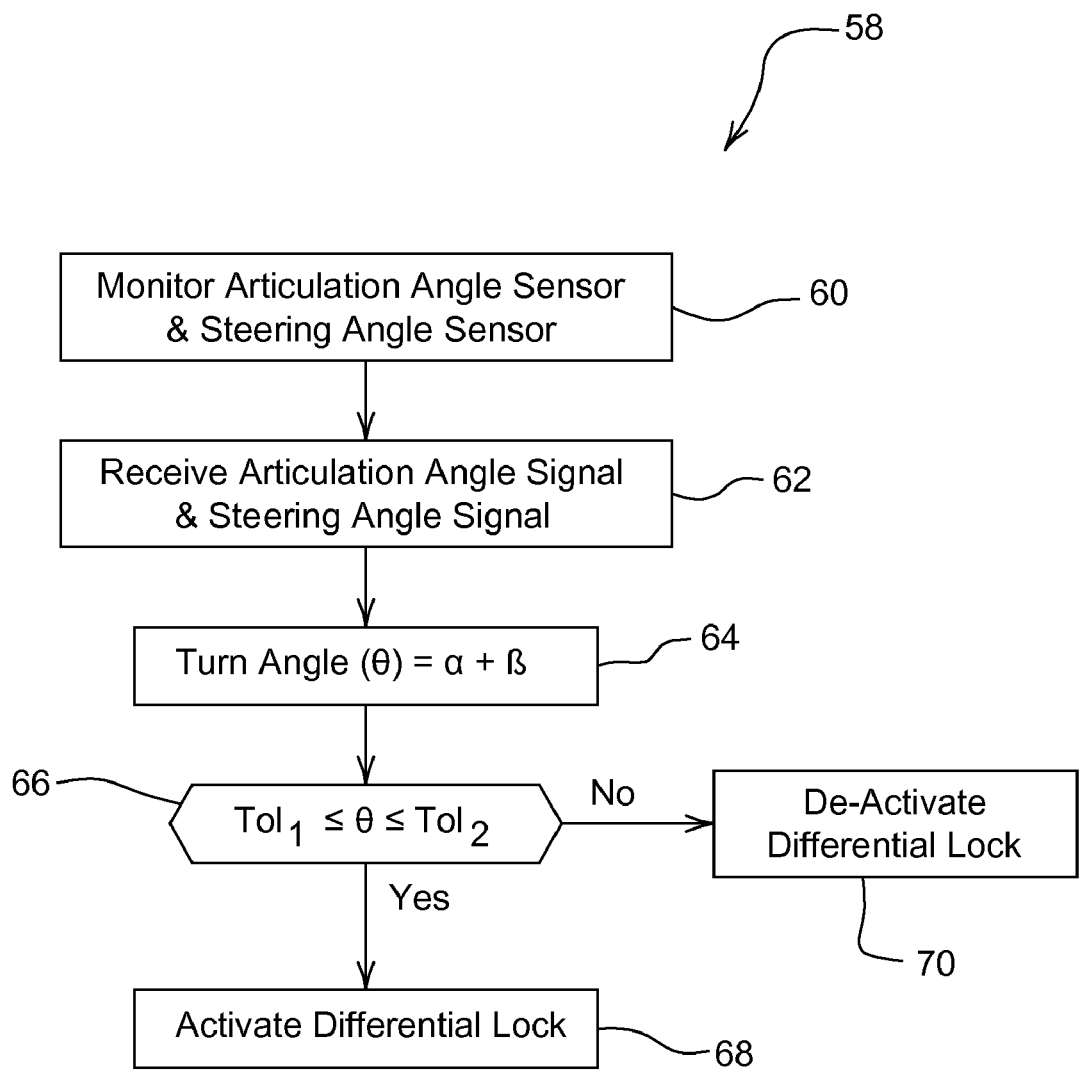
FIG. 3 is a flow chart illustrating a control routine for automatically controlling a differential lock by use of the differential lock control system of FIG. 2.

Referring to FIG. 3, there is shown a control routine 58 for controlling the differential lock 14. In particular, the control routine 58 shown in FIG. 3 concerns only automatic control of the differential lock 14. However, as indicated above, the control routine 58 could also include the option of manual control of the differential lock 14.

In act 60 of the control routine 58, the controller 44 monitors output of the articulation angle sensor 50 for the articulation angle signal representative of the articulation angle α and output of the steering angle sensor 52 for the steering angle signal representative of the steering angle β. In act 62, the controller 44 receives these two signals.

In act 64, the controller 44 sums the articulation angle α and the steering angle β to obtain the turn angle θ of the vehicle 10. In act 66, the controller 44 determines if the turn angle of the vehicle 10 is within the predetermined tolerance about the zero turn angle. If yes, in act 68, the vehicle 10 is considered to be traveling in a generally straight direction in which case the controller 44 commands activation of the differential lock 14. If no, in act 70, the vehicle 10 is considered to be turning (i.e., not traveling in a generally straight direction) in which case the controller 44 commands de-activation of the differential lock 14.

As alluded to above, the controller 44 may take the form of one or more electronic controllers. In such a case, the controller has a processor and a memory. The memory has stored therein a plurality of instructions which, when executed by the processor, cause the processor to perform the various functions of the controller 44.

Although the vehicle 10 has been described in the exemplary context of a motor grader, it is to be understood that the vehicle 10 may take the form of any type of work vehicle or other vehicle, articulated or not, including, but not limited to, four-wheel drive loaders, loader backhoes, skidders, and the like.

Further, it is to be understood that each ground-engaging traction element disclosed herein (e.g., traction elements 20a, 20b, and 20c) may take any suitable form including, but not limited to, a wheel, a track, or the like. In the particular case of a motor grader, the traction elements are typically wheels, although it is contemplated that tracks may be used in lieu thereof.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claim is:

1. A method for controlling a differential lock of a work vehicle, comprising:
   receiving at least one turn angle signal,
   determining if the work vehicle is oriented to travel in a generally straight direction based on the at least one turn angle signal, and
   if the work vehicle is so oriented, automatically commanding activation of the differential lock, wherein:
   the at least one turn angle signal comprises a single articulation angle signal representative of an articulation angle between articulated front and rear sections of the work vehicle and a single steering angle signal representative of a steering angle of a ground-engaging traction element of the work vehicle, and
   the determining comprises determining if the work vehicle is oriented to travel in a generally straight direction based on the articulation angle signal and the steering angle signal.

2. The method of claim 1, wherein the determining comprises calculating a turn angle ($\theta$) of the work vehicle by summing the articulation angle ($\alpha$) and the steering angle ($\beta$) (i.e., $\theta = \alpha + \beta$).

3. The method of claim 2, wherein the determining comprises determining if the turn angle is within a predetermined tolerance about a zero turn angle.

4. A differential lock control system for controlling a differential lock of a work vehicle, comprising:
   a single articulation angle sensor configured to sense an articulation angle between articulated front and rear sections of the work vehicle,
   a single steering angle sensor configured to sense a steering angle of a ground-engaging traction element of the work vehicle, and
   a controller configured to receive an articulation angle signal representative of the articulation angle and a steering angle signal representative of the steering angle and determine if the work vehicle is oriented to travel in a generally straight direction based on the articulation angle signal and the steering angle signal.

5. The differential lock control system of claim 4, wherein the controller is configured to calculate a turn angle ($\theta$) of the work vehicle by summing the articulation angle ($\alpha$) and the steering angle ($\beta$) (i.e., $\theta = \alpha + \beta$).

6. The differential lock control system of claim 5, wherein the controller is configured to compare the turn angle to predetermined turn criteria.

7. The differential lock control system of claim 5, wherein the controller is configured to determine if the turn angle is within a predetermined tolerance about a zero turn angle.

8. A work vehicle, comprising:
   articulated front and rear sections,
   a ground-engaging traction element,
   a differential,
   a differential lock, and
   a differential lock control system configured to control the differential lock, wherein the differential lock control system comprises a single articulation angle sensor configured to sense an articulation angle between the front and rear sections, a single steering angle sensor configured to sense a steering angle of the ground-engaging traction element, and a controller configured to receive an articulation angle signal representative of the articulation angle and a steering angle signal representative of the steering angle, determine if the work vehicle is oriented to travel in a generally straight direction based on the articulation angle signal and the steering angle signal, and, if the work vehicle is so oriented, automatically command activation of the differential lock.

9. The work vehicle of claim 8, wherein the controller is configured to calculate a turn angle ($\theta$) of the work vehicle by summing the articulation angle ($\alpha$) and the steering angle ($\beta$) (i.e., $\theta = \alpha + \beta$), and determine if the turn angle is within a predetermined tolerance about a zero turn angle.

10. The work vehicle of claim 9, wherein the work vehicle is a motor grader.

11. The work vehicle of claim 8, wherein the controller is configured to calculate a turn angle ($\theta$) of the work vehicle by summing the articulation angle and the steering angle ($\beta$) (i.e., $\theta = \alpha + \beta$).

12. The work vehicle of claim 11, wherein the controller is configured to determine if the turn angle is within a predetermined tolerance about a zero turn angle.

* * * * *